(12) United States Patent
Lee et al.

(10) Patent No.: US 10,872,063 B2
(45) Date of Patent: Dec. 22, 2020

(54) LOCAL TERMINAL AND SYNCHRONIZATION SYSTEM INCLUDING THE SAME

(71) Applicant: ASD Korea, Seoul (KR)

(72) Inventors: Sun Ung Lee, Seoul (KR); Maksim Azarov, Nizhnij Novgorod (RU)

(73) Assignee: ASD KOREA, Seoul (KR)

( * ) Notice: Subject to any disclaimer, the term of this patent is extended or adjusted under 35 U.S.C. 154(b) by 121 days.

(21) Appl. No.: 16/176,042

(22) Filed: Oct. 31, 2018

(65) Prior Publication Data

US 2020/0089785 A1  Mar. 19, 2020

(30) Foreign Application Priority Data

Sep. 17, 2018  (KR) .................. 10-2018-0110875

(51) Int. Cl.
*G06F 16/00* (2019.01)
*G06F 16/178* (2019.01)
*G06F 16/182* (2019.01)
*G06F 16/22* (2019.01)
*H04L 29/08* (2006.01)

(52) U.S. Cl.
CPC ........ *G06F 16/178* (2019.01); *G06F 16/1844* (2019.01); *G06F 16/2246* (2019.01); *H04L 67/06* (2013.01); *H04L 67/1095* (2013.01); *H04L 67/1097* (2013.01)

(58) Field of Classification Search
None
See application file for complete search history.

(56) References Cited

U.S. PATENT DOCUMENTS

| 7,720,890 | B2 | 5/2010 | Rao et al. |
| 10,003,650 | B2* | 6/2018 | Shetty .................. G06F 11/142 |
| 2015/0186668 | A1* | 7/2015 | Whaley ................ G06F 16/178 |
| | | | 713/156 |
| 2019/0034453 | A1* | 1/2019 | Jarvis ..................... G06F 16/13 |

FOREIGN PATENT DOCUMENTS

KR  10-1279763 B1  7/2013

\* cited by examiner

*Primary Examiner* — Anhtai V Tran
(74) *Attorney, Agent, or Firm* — The PL Law Group, PLLC

(57) ABSTRACT

In a synchronization system including a local terminal, latest metadata of a file in a local storage and latest metadata of a file in the server storage are managed in a first tree database, which is a virtual database in a local terminal, and each of the local terminals is allowed to upload or download a changed file on the basis of the metadata in the first tree database so that a conflict that may occur due to multiple users simultaneously changing files can be minimized.

12 Claims, 9 Drawing Sheets

LOCAL TERMINAL AND SYNCHRONIZATION SYSTEM INCLUDING THE SAME

CROSS-REFERENCE TO RELATED APPLICATION(S)

This application claims the benefit under 35 USC § 119(a) of Korean Patent Application No. 10-2018-0110875, filed on Sep. 17, 2018, in the Korean Intellectual Property Office, the entire disclosure of which is incorporated herein by reference for all purposes.

BACKGROUND

1. Field

The following description relates to a technology for synchronization between storages for providing a cloud service.

2. Description of Related Art

The advance development of network technology has allowed data stored in a local terminal (e.g., a desktop computer, a notebook computer, a portable device, and the like) used by a user to be stored in a server storage in the cloud, and the user can use the data stored in the server storage anytime and anywhere using his/her account whenever the user needs it. The user may upload or download files through the server storage and may check in real time a modified file through file sharing and synchronization.

However, conventionally, the server storage synchronizes with a local storage in a local terminal through a polling method. In this case, there is a drawback in that a load on the server storage increases as the number of users using the server storage increases. In addition, when multiple users change files at the same time, a conflict occurs in the process of synchronizing the changed files, and accordingly there are difficulties in providing the cloud service.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide a means for distributing a load and minimizing a conflict in the process of synchronizing between a server storage and a local storage.

In one general aspect, there is provided a local terminal having a local storage and performing file synchronization between a set server storage and the local storage, the local terminal including: a first tree database to which latest metadata of a file in the local storage and latest metadata of a file in the server storage are updated in real time; a first calculator configured to compare the metadata of the file in the local storage with metadata stored in the first tree database; a first synchronizer including a first executor configured to, when from a comparison result of the first calculator it is determined that the file in the local storage has been changed, update the metadata of the file in the local storage in real time to the first tree database and an uploader configured to upload the changed file in the local storage to the server storage; a detector configured to monitor the file in the server storage and, when the file in the server storage is changed, update metadata of the changed file in the server storage to a second tree database in the local terminal; a second calculator configured to compare the metadata stored in the first tree database with metadata stored in the second tree database; and a second synchronizer including a second executor configured to, when from a comparison result of the second calculator it is determined that metadata newly updated to the second tree database is newer than the metadata stored in the first tree database, update the metadata newly updated to the second tree database in real time to the first tree database and a downloader configured to download the changed file in the server storage to the local storage.

The first executor may update the metadata of the changed file in the local storage in real time to the first tree database within a first period of time and the uploader may upload the changed file in the local storage to the server storage for a second period of time that is longer than the first period of time.

The second executor may update the metadata newly updated to the second tree database in real time to the first tree database within a third period of time and the downloader may download the changed file in the server storage to the local storage for a fourth period of time that is longer than the third period of time.

The metadata update and file upload process in the first synchronizer may be performed independently of the metadata update and file download process in the second synchronizer.

When the file in the local storage or the file in the server storage is changed a plurality of times, metadata of the changed files may be updated in real time to the first tree database and then the changed files may be uploaded to the server storage or downloaded to the local storage.

When it is determined that the metadata newly updated to the second tree database is newer than the metadata stored in the first tree database, it may indicate that metadata of a file changed in a local storage in a different terminal is newly updated to the second tree database as the file changed in the local storage in the different local terminal is uploaded to the server storage.

When the comparison result of the first calculator indicates that the metadata of the file in the local storage matches the metadata stored in the first tree database and the comparison result of the second calculator indicates that the metadata stored in the second tree database matches the metadata stored in the first tree database, the file synchronization between the server storage and the local storage may be completed.

In another general aspect, there is provided a synchronization system including: a plurality of local terminals which each have a local storage and perform file synchronization between a set server storage and the local storage, wherein each of the plurality of local terminals includes: a first tree database to which latest metadata of a file in the local storage and latest metadata of a file in the server storage are updated in real time; a first calculator configured to compare the metadata of the file in the local storage with metadata stored in the first tree database; a first synchronizer including a first executor configured to, when from a comparison result of the first calculator it is determined that the file in the local storage has been changed, update the metadata of the file in the local storage in real time to the first tree database and an uploader configured to upload the changed file in the local storage to the server storage; a detector configured to monitor the file in the server storage and, when the file in the server storage is changed, update metadata of the changed file in the server storage to a second tree database in the local terminal; a second calculator configured to compare the metadata stored in the first tree database with metadata stored in the second tree database; and a second synchronizer including a second executor configured to, when from a comparison result of the second calculator it is determined that metadata newly updated to the second tree database is newer than the metadata stored in the first tree database, update the metadata newly updated to the second tree database in real time to the first tree database and a downloader configured to download the changed file in the server storage to the local storage, and the first tree database of each of the plurality of local terminals is updated in real time in the same form as each other.

Other features and aspects will be apparent from the following detailed description, the drawings, and the claims.

Figure 1:
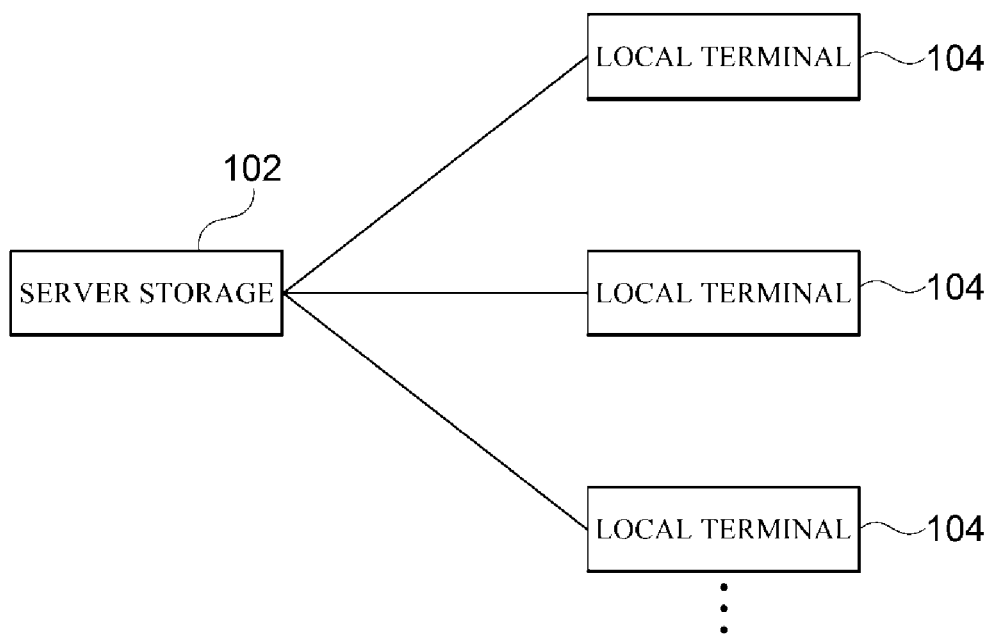
FIG. 1 is a block diagram illustrating in detail a configuration of a synchronization system according to an exemplary embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a block diagram illustrating in detail a configuration of a synchronization system according to an exemplary embodiment of the present disclosure. As shown in FIG. 1, the synchronization system 100 in accordance with the exemplary embodiment includes a server storage 102 and a plurality of local terminals 104.

The server storage 102 is a cloud storage associated with a cloud service provided from a server (not shown) and includes predetermined space for file storage. In the present embodiments, the cloud service may be, for example, file sharing, file upload/download, file synchronization, file movement, or the like. The cloud service may be used to, for example, share work files (or folders) more easily and quickly among department members or team members in a company by using the server storage 102 as a business online storage. The server storage 102 may be connected to each of the local terminals 104 over a network and each local terminal 104 may access the server storage 102 to upload or download a file. Here, the network may include the internet, one or more local area networks, wide area networks, cellular networks, mobile networks, other types of networks, and a combination thereof.

The local terminal 104 is a device owned by a user, which may be, for example, a desktop computer, a notebook computer, a tablet computer, a smartphone, a personal digital assistant (PDA), and a wearable device, such as a smart watch and the like. Each local terminal 104 may have a local storage (not shown), and a file in the local storage may be upload to the server storage 102, or a file in the server storage 102 may be downloaded and stored in the local storage.

In one example, the user may use the local terminal 104 may create a new file in the local storage or modify or delete file in the local storage. In this case, the local terminal 104 may upload a changed file to the server storage 102. The server storage 102 may allow the uploaded file, i.e., the changed file, to be downloaded to a local storage of a different local terminal 104. Accordingly, the modified content of one local terminal 104 may be synchronized to other local terminals 104. In this case, uploading/downloading a changed file means not only uploading/downloading a newly created file, but also uploading/downloading a modified part or a file containing a modified part if at least a part of an existing file is modified.

As such, when a file in the local storage or the server storage 102 is changed (for example, creation, deletion, or modification of a file), the local terminal 104 detects the change and performs synchronization with the other terminals.

At this time, the local terminal 104 may perform synchronization between the local storage and the server storage 102 by operating two synchronization loops (a first loop and a second loop which will be described later) on the basis of a virtual database provided therein, instead of using an existing polling method.

Figure 2:
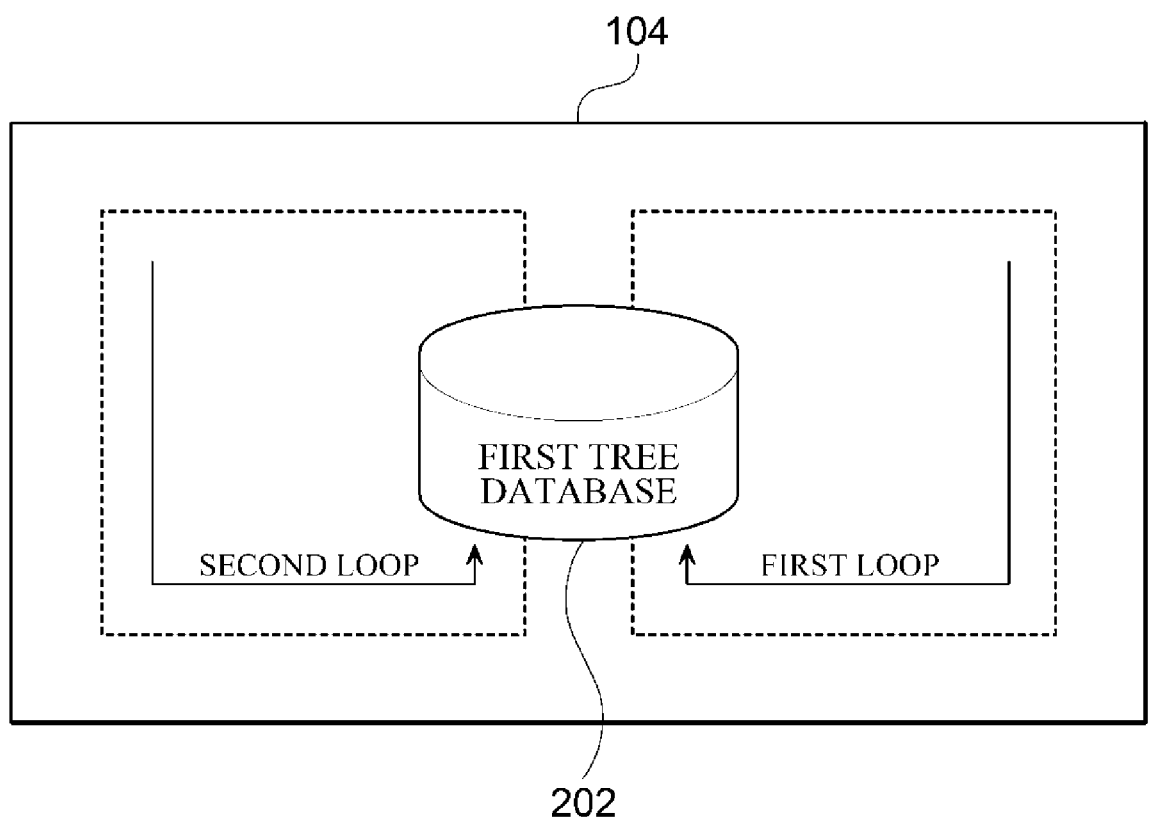
FIG. 2 is a diagram for describing a synchronization loop performed in the local terminal in order to synchronize between a local storage and a server storage according to an exemplary embodiment of the present disclosure.

FIG. 2 is a diagram for describing a synchronization loop performed in the local terminal 104 in order to synchronize between a local storage and a server storage according to an exemplary embodiment of the present disclosure.

In the present embodiments, a first tree database 202 is a virtual database in which the latest metadata of a file in the local storage and the latest metadata of a file in the server storage are updated in real time and in which metadata of a file which is changed in the local storage or in the server storage is reflected in real time. Here, the metadata of a file is a variety of information indicating the attributes of the file and is used in a broad sense including, for example, a name, version, modified date, or creation date, or storage location (e.g., a name or address of a folder where the current file is stored, a name or address of a higher-level folder or a name or address of a lower-level folder of a folder where the current file is stored, and the like) of the file, as well as structure information (e.g., information on a tree structure of a folder) of a folder including the file, and a name and location of the folder.

In addition, the first loop is a synchronization loop that is performed in the local terminal 104 as a file in the local storage has changed, and a second loop is a synchronization loop that is performed in the local terminal 104 as a file in the server storage has changed. The first loop and the second loop are performed independently of each other, and each time the first loop or the second loop is performed, the latest metadata of the changed file is updated in real time in the first tree database 202.

That is, not an actual physical file (or folder) is stored in the first tree database 202, but metadata (e.g., a name, version, modified date, or creation date of a file, a storage location of a file, and structure information of a folder related to the file) that represents attribute of the file is updated in the first tree database 202. The metadata update is performed within a very short period of time as compared to upload/download of an actual physical file, and thus even when a file in the local storage or server storage is changed several times, the changed metadata can be reflected in real time in the first tree database 202.

Figure 3:
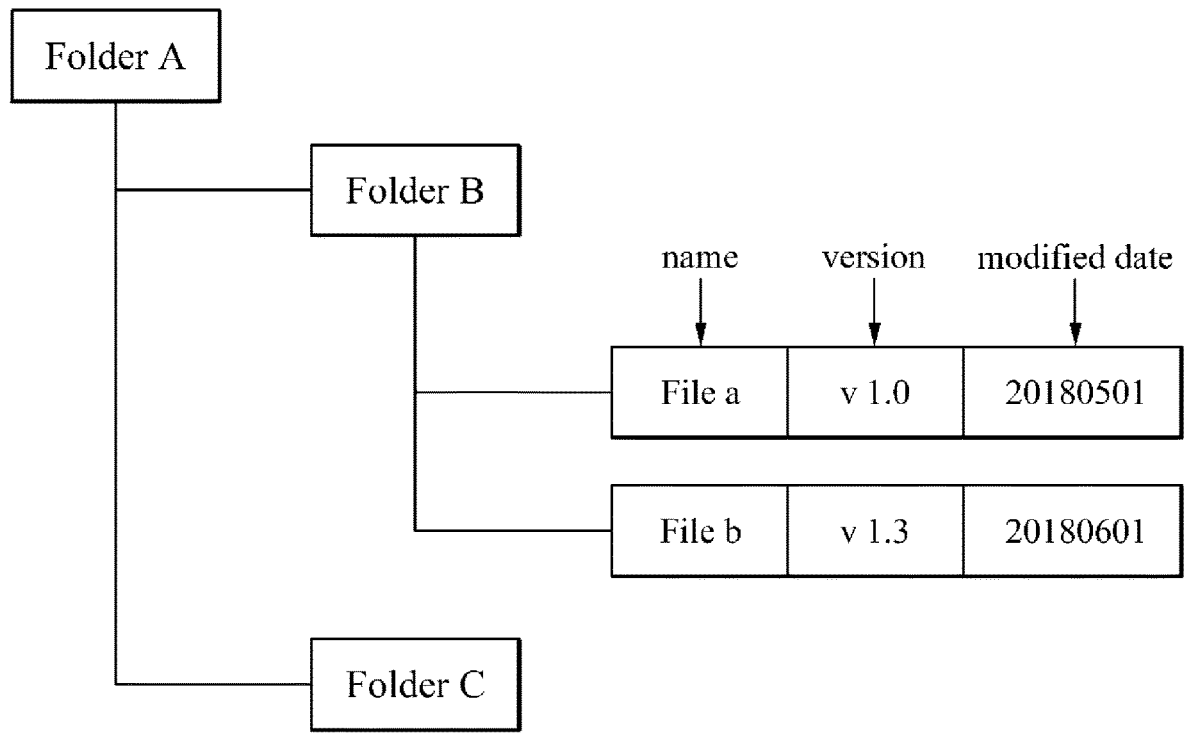
FIG. 3 is a diagram illustrating an example of metadata stored in a first tree database according to an exemplary embodiment of the present disclosure.

FIG. 3 is a diagram illustrating an example of metadata stored in the first tree database 101 according to an exemplary embodiment of the present disclosure.

Referring to FIG. 3, a tree structure is formed on the basis of the connection relationship among a folder to which a file corresponding to the above-described metadata belongs, a higher-level folder of said folder, and other lower-level folders of the higher-level folder, and the tree structure is stored in the first tree database 202. In the example shown in FIG. 3, folder B and folder C may be lower-level folders of folder A and file a and file b may be inside folder B. In this case, a version and modified date of file a is 1.0 and May 1, 2018, respectively, and a version and modified date of file b is 1.3 and Jun. 1, 2018, respectively.

Figure 4:
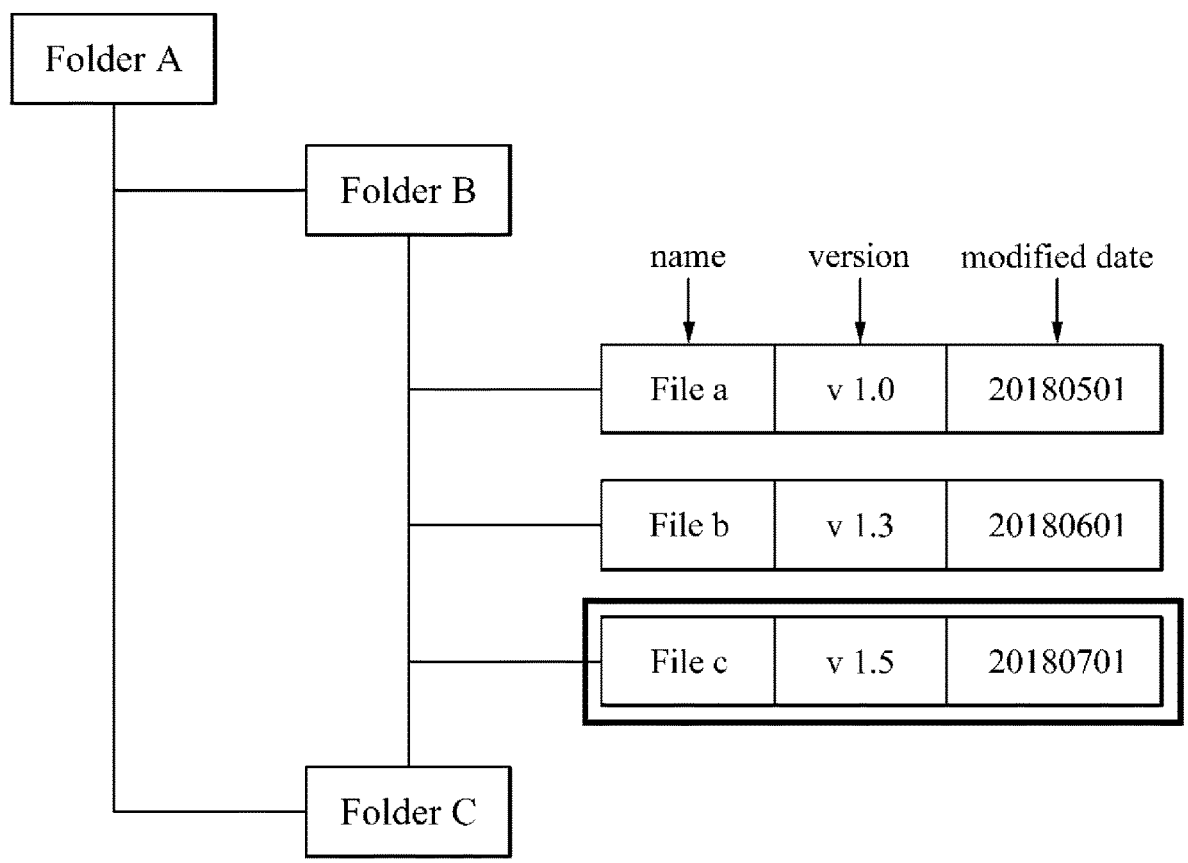
FIG. 4 is a diagram illustrating an example in which metadata in the first tree database of FIG. 3 is updated on the basis of a first loop according to an exemplary embodiment of the present disclosure.
Figure 5:
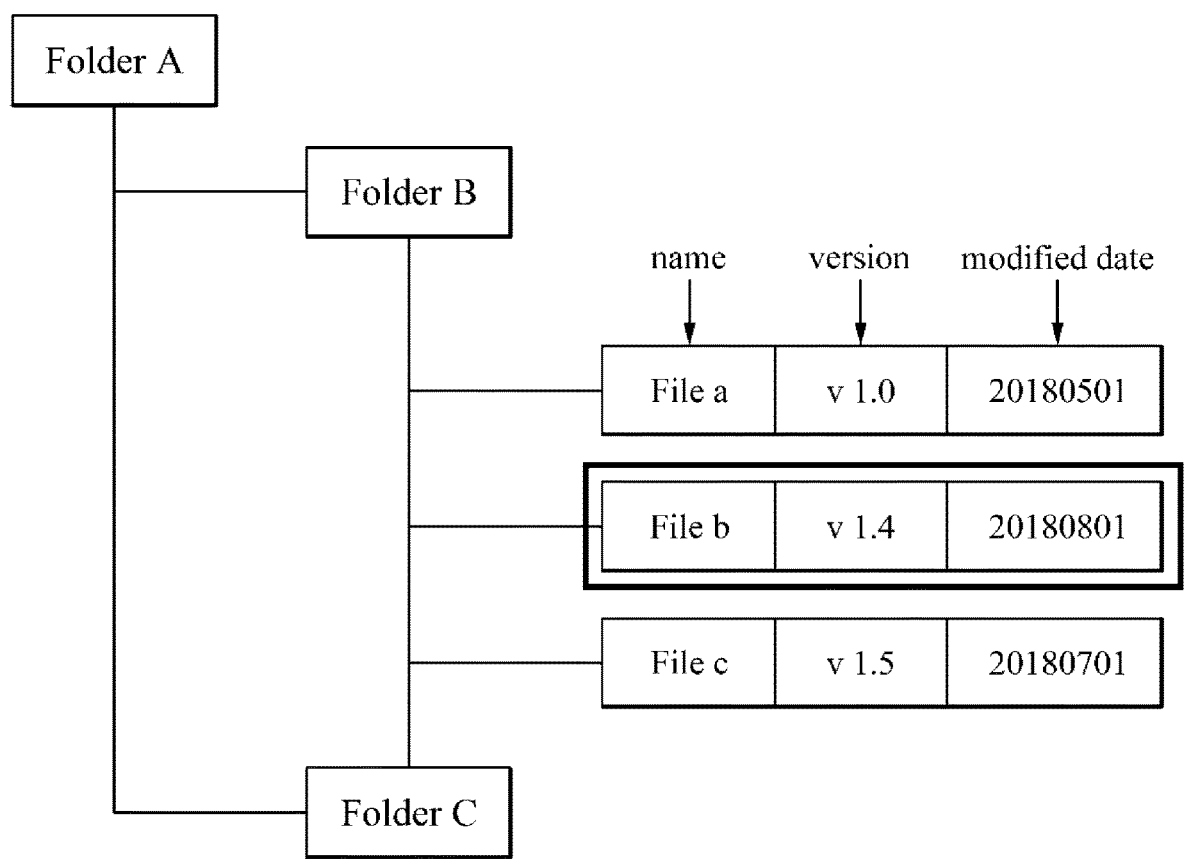
FIG. 5 is a diagram illustrating an example in which metadata in a first tree database of FIG. 4 is updated on the basis of a second loop according to an exemplary embodiment of the present disclosure.

FIG. 4 is a diagram illustrating an example in which metadata in the first tree database 202 of FIG. 3 is updated on the basis of the first loop according to an exemplary embodiment of the present disclosure, and FIG. 5 is a diagram illustrating an example in which metadata in a first tree database 202 of FIG. 4 is updated on the basis of the second loop according to an exemplary embodiment of the present disclosure.

Referring to FIG. 4, when a user newly creates file c in a local storage inside the local terminal 104, metadata of the newly created file c may be updated in real time in the first tree database 202.

In addition, referring to FIG. 5, when another user modifies file b stored in a local storage inside another local terminal 104 and the modified file b is uploaded to the server storage 102, metadata of the modified file b may be updated in real time in the first tree database 202.

As described above, the first loop and the second loop may be performed independently of each other, and each time the first loop or the second loop is performed, the latest metadata of a changed file may be updated in real time in the first tree database 202.

Hereinafter, a synchronization process in accordance with the first loop and the second loop will be described in detail.

Figure 6:
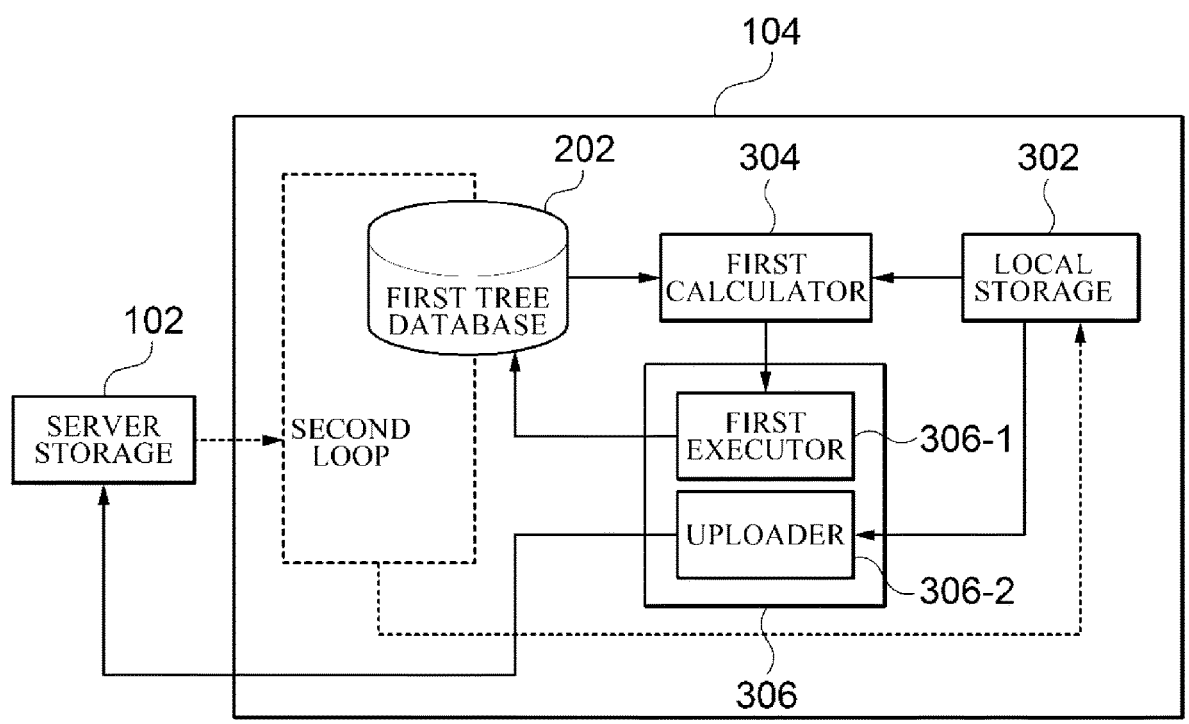
FIG. 6 is a diagram for describing a synchronization process in accordance with the first loop of the exemplary embodiment of the present disclosure.

FIG. 6 is a diagram for describing a synchronization process in accordance with the first loop of the exemplary embodiment of the present disclosure.

As shown in FIG. 6, a local terminal 104 includes a local storage 302, a first calculator 304, and a first synchronizer 306. The local storage 302, the first calculator 304, and the first synchronizer 306 perform the synchronization process in accordance with the first loop shown in FIG. 2.

The local storage 302 which is a storage space which is a target to be synchronized with the server storage 102 may be provided in the local terminal 104. When a file is newly created in the local storage 302 or when a file in the local storage 302 is modified, deleted, or structure information of a folder related to files included in the local storage 302 is changed (i.e., when a file in the local storage 302 is changed), the local storage 302 may transmit a wake-up message to the first calculator 304.

Upon receiving the wake-up message, the first calculator 304 may compare metadata of the file in the local storage 302 with metadata stored in the first tree database 202 to calculate a difference between the two pieces of metadata. When from the comparison result of the first calculator 304 it is determined that the file in the local storage 302 has been changed (i.e., when it is determined that the metadata in the local storage 302 is newer than the metadata stored in the first tree database 202), the first calculator 304 transmits a synchronization command to the first synchronizer 306.

Upon receiving the synchronization command, the first synchronizer 306 performs metadata update and file upload process. The first synchronizer 306 may include a first executor 306-1 and an uploader 306-2.

The first executor 306-1 is a module for updating the changed metadata to the first tree database 202. Specifically, when from the comparison result from the first calculator 304, it is determined that the file in the local storage 302 has been changed, the first executor 306-1 updates the changed metadata in the local storage 302 in real time to the first tree database 202. In one example, when a file is newly created in the local storage 302, the first executor 306-1 may update the metadata of the newly created file (e.g., a name, version, and created date of the newly created file) in real time to the first tree database 202.

The uploader 306-2 is a module for transmitting an actual physical file to the server storage 102. Specifically, when from the comparison result of the first calculator 304, it is determined that the file in the local storage 302 has been changed, the uploader 306-2 uploads the changed file in the local storage 302 to the server storage 102. In one example, when a file is newly created in the local storage 302, the uploader 306-2 may upload the newly created file to the server storage 102. In this case, it may take a longer period of time to upload the actual physical file depending on the size of the file. Thus, in the embodiments of the present disclosure, the update of metadata and the upload of an actual physical file may be independently performed in different paths.

Specifically, the first executor 306-1 may update the metadata of the changed file in the local storage 302 in real time to the first tree database 202 within a first period of time (e.g., within 0.2 seconds). On the other hand, the uploader 306-2 may upload the changed file in the local storage 302 to the server storage 102 for a second period of time (e.g., within one hour) that is longer than the first period of time.

Accordingly, the operation performed by the first executor 306-1 may be referred to as a "fast-operation," which is quickly performed within the first period of time, and the operation performed by the uploader 306-2 may be referred to as a "long-operation," which is performed for the second period of time longer than the first period of time. In the present embodiments, the fast-operation may include creation/deletion of a name of a file/folder, edition of version/modified date, and the like, and the long-operation may include file upload/download and the like.

Figure 7:
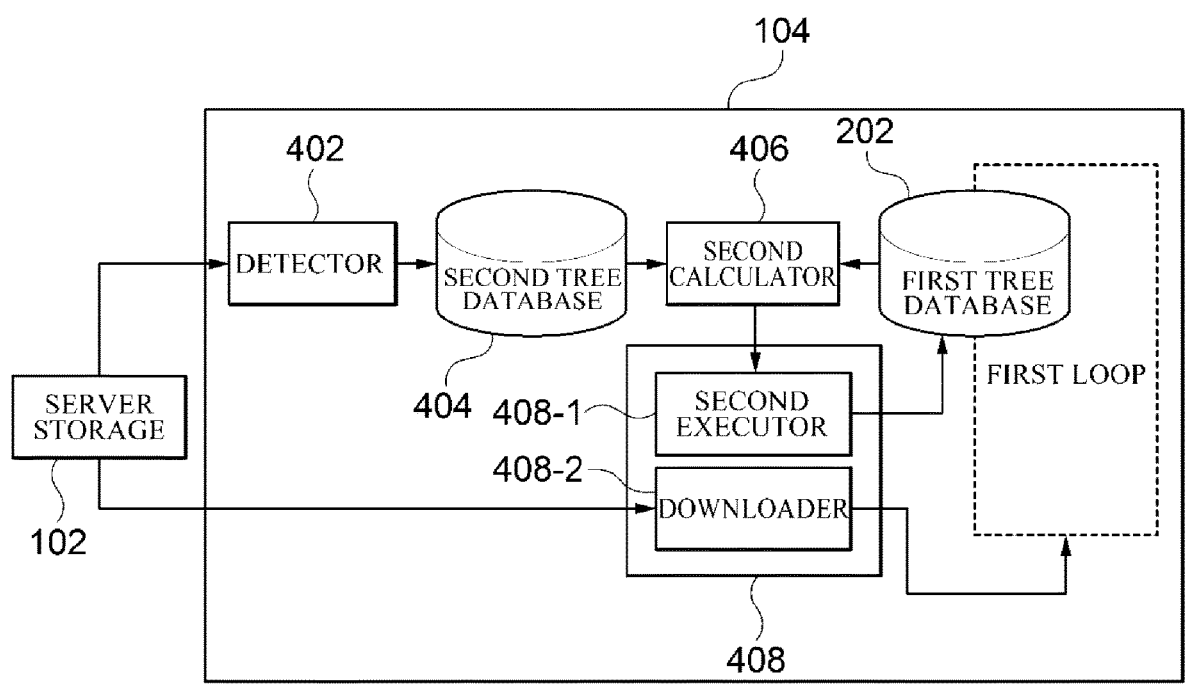
FIG. 7 is a diagram for describing a synchronization process in accordance with the second loop of the exemplary embodiment.

FIG. 7 is a diagram for describing a synchronization process in accordance with the second loop of the exemplary embodiment.

As shown in FIG. 7, the local terminal 104 may further include a detector 402, a second tree database 404, a second calculator 406, and a second synchronizer 408. The sensor 402, the second tree database 404, the second calculator 406, and the second synchronizer 408 perform the synchronization process in accordance with the second loop shown in FIG. 2.

The detector 402 is connected to the server storage 102 over a network and monitors a file in the server storage 102. When a file is newly created in the server storage 102 or when a file in the server storage 102 is modified or deleted (i.e., when a file in the server storage 102 is changed), the detector 402 may detect such an event. In one example, when the user newly creates file c in a local storage in the local terminal 104 and in turn the newly created file c is uploaded to the server storage 102, the detector 402 may detect such an event. In another example, when another user modifies file b stored in a local storage in another local terminal 104 and in turn the modified file b is uploaded to the server storage 102, the detector 402 may detect such an event. When the detector 402 detects a change in the file in the server storage 102, the detector 402 may update metadata of the changed file in the server storage 102 to the second tree database 404 in the local terminal 104.

The second tree database 404 is a repository where metadata of a file in the server storage 102 is stored. When a file in the server storage 102 is changed, the second tree database 404 may receive the metadata of the changed file through the detector 402.

The second calculator 406 compares the metadata stored in the first tree database 202 with the metadata stored in the second tree database 404 to calculate a difference between the two pieces of metadata. When from the comparison result of the second calculator 406 it is determined that the metadata newly updated to the second tree database 404 is newer than the metadata stored in the first tree database 202, the second calculator 406 transmits a synchronization command to the second synchronizer 408. In this case, if it is determined that the metadata newly updated to the second tree database 404 is newer than the metadata stored in the first tree database 202, it may indicate that the metadata of a file changed in a local storage of a different local terminal 104 is newly updated to the second tree database 404 as the file changed in the local storage in the different local terminal 104 is uploaded to the server storage 102.

Meanwhile, when, from the comparison result of the second calculator 406, it is determined that the metadata stored in the second tree database 404 matches the metadata stored in the first tree database 202, the second calculator 406 does not transmit the synchronization command to the second synchronizer 408.

Upon receiving the synchronization command, the second synchronizer 408 performs metadata upload and file download process. The second synchronizer 408 may further include a second executor 408-1 and a downloader 408-2.

The second executor 408-1 is a module for updating the metadata of the changed file to the first tree database 202. Specifically, when from the comparison result of the second calculator 406 it is determined that the metadata newly updated to the second tree database 404 is newer than the metadata stored in the first tree database 202, the second executor 408-1 updates the metadata, which has been newly updated to the second tree database 404, in real time to the first tree database 202. In one example, when a file is newly created in the server storage 102, the second executor 408-1 may fetch metadata of the newly created file (e.g., a name, version, and created date of the newly created file) from the second tree database 404 and update the metadata in real time to the first tree database 202.

The downloader 408-2 is a module for transmitting an actual physical file to the local storage 302. Specifically, when from the comparison result of the second calculator 406 it is determined that the metadata newly updated to the second tree database 404 is newer than the metadata stored in the first tree database 202, the downloader 408-2 may download the changed file in the server storage 102 to the local storage 302. In one embodiment, when a file is newly created in the server storage 102, the downloader 408-2 may download the newly created file to the local storage 302. In this case, it may take a longer period of time to download the actual physical file depending to the size of the file. Accordingly, in the embodiments of the present disclosure, the update of metadata and download of an actual physical file may be independently performed in different paths.

Specifically, the second executor 408-1 may update the metadata, which has been newly updated to the second tree database 404, in real time to the first tree database 202 within a third period of time (e.g., within 0.1 second). On the other hand, the downloader 408-2 may download the changed file in the server storage 102 to the local storage 302 for a fourth period of time (e.g., 2 hours) that is longer than the third period of time.

Accordingly, an operation performed by the second executor 408-1 may be referred to as a "fast-operation" which is quickly performed within the third period of time, and an operation performed by the downloader 408-2 may be referred to as a "long-operation" which is performed for the fourth period of time longer than the third period of time. As described above, the fast-operation may include a creation/deletion of a name of a file/folder, edition of version/modified date, and the like, and the long-operation may include file upload/download and the like.

Figure 8:
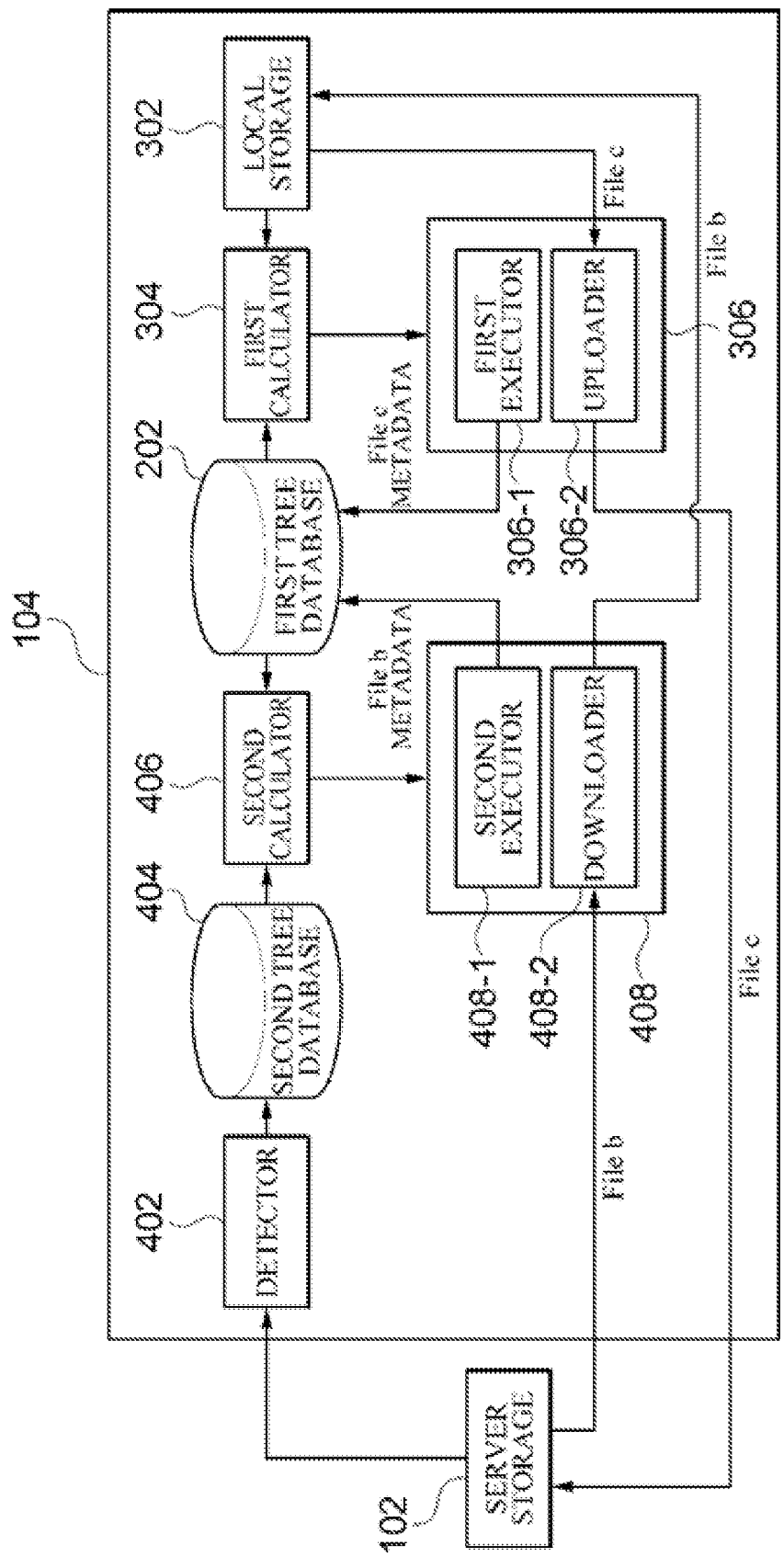
FIG. 8 is a diagram illustrating an example in which synchronization processes in accordance with the first loop and the second loop of the exemplary embodiments are performed independently of each other.

FIG. 8 is a diagram illustrating an example in which synchronization processes in accordance with the first loop and the second loop of the exemplary embodiments are performed independently of each other.

In the present embodiments, the metadata update and file upload process of the first synchronizer 306 may be performed independently of the metadata update and file download process of the second synchronizer 408.

Hereinafter, i) a synchronization process in accordance with the first loop when a user newly creates file c in the local storage 302 through the local terminal 104 and ii) a synchronization process in accordance with the second loop when another user modifies file b stored in a local storage of another terminal 104 and in turn the modified file b is uploaded to the server storage 102 will be described.

i) operations for synchronization in accordance with the first loop when the user newly creates file c in the local storage 302 through the local terminal 104:

a. detecting, at the local storage 302, the upload of file c;

b transmitting, from the local storage 302, a wake-up message to the first calculator 304;

c. comparing, at the first calculator 304, metadata of the file in the local storage 302 with metadata stored in the first tree database 202→the comparison result indicating that the metadata of the file in the local storage 302 (i.e., metadata of file c exists) is newer than the metadata stored in the first tree database 202 (i.e., the metadata of file c does not exists);

d. transmitting, from the first calculator 304, a synchronization command to the first synchronizer 306;

e. updating, at the first executor 306-1, metadata of the newly created file c to the first tree database 202 within the first period of time (fast-operation);

f. uploading, at the uploader 306-2, the newly created file c to the server storage 102 for the second period of time that is longer than the first period of time (long-operation);

g. detecting, at the detector 402, that the new file c is created in the server storage 102 and storing the metadata of the file c in the second tree database 404;

h. comparing, at the second calculator 406, the metadata stored in the first tree database 202 with the metadata stored in the second tree database 404→the comparison result indicating that the metadata stored in the first tree database 202 (i.e., the metadata of file c exists) matches the metadata stored in the second tree database 404 (i.e., the metadata of file c exists); and i. terminating the synchronization process in accordance with the first loop ii) operations for synchronization in accordance with the second loop when another user modifies file b stored in a local storage of another local terminal 104 and in turn the modified file b is uploaded to the server storage 102:

a. detecting, at the detector 402, detecting that file b in the server storage 102 is changed, and updating metadata of file b to the second tree database 404;

b. comparing, at the second calculator 406, metadata stored in the first tree database 202 with metadata stored in the second tree database 404→the comparison result indicating that metadata newly updated to the second tree database 404 (i.e., a version of file b) is newer than the metadata stored in the first tree database 202 (i.e., a version of file b);

c. updating, at the second executor 408-1, the metadata of the changed file b to the first tree database 202 within the third period of time (fast-operation);

d. transmitting, from the downloader 408-1, the changed file b to the local storage 302 for the fourth period of time that is longer than the third period of time;

e. detecting, at the local storage 302, the change of file c;

f. transmitting, from the local storage 302, a wake-up message to the first calculator 304;

g. comparing, at the first calculator 304, the metadata in the local storage 302 with the metadata stored in the first tree database 202→the comparison result indicating that the metadata in the local storage 302 (i.e., a version of file b) matches the metadata stored in the first tree database 202 (i.e., a version of file b); and h. terminating the synchronization process in accordance with the first loop.

According to the synchronization process in accordance with the first loop as described above, the metadata stored in the first tree database 202 may be updated as shown in FIG. 4, and according to the synchronization process in accordance with the second loop, the metadata stored in the first tree database 202 may be updated as shown in FIG. 5. The synchronization process in accordance with the first loop and the synchronization process in accordance with the second loop may be independently and asynchronously performed, or may be performed simultaneously. At this time, the changed file may be uploaded/downloaded separately from the metadata of the file.

In addition, when the file in the local storage 302 or the file in server storage 102 is changed several times, metadata of the changed files may be updated in real time to the first tree database 202 and then the changed files may be uploaded to the server storage 102 or downloaded to the local storage 302.

The synchronization process is continuously performed until the metadata in the first tree database 202, the metadata in the second tree database 404, and the metadata of the file in the local storage 302 mutually match. That is, when the comparison result of the first calculator 304 indicates that the metadata of the file in the local storage 302 matches the metadata stored in the first tree database 202 and the comparison result of the second calculator 406 indicates that the metadata stored in the second tree database 404 matches the metadata stored in the first tree database 202, the file synchronization between the server storage 102 and the local storage 302 may be completed. Such the synchronization completion may be performed independently by each of the local terminals 104.

In this case, the first tree database 202 serves as a linking medium connecting the second tree database 404 and the local storage 302 and is always maintained in an ideal state in which the latest metadata is updated in real time.

In addition, each of the local terminals 104 of FIG. 1 includes the above elements including the first tree database 202, and the first tree database 202 of each of the local terminals 104 is updated in real time in the same form as each other.

In one embodiment, when file b in the local storage 302 of local terminal A 104 is newly created and uploaded to the server storage 102, the first tree database 202 of local terminal A 104, the first tree database 202 of local terminal B 104, the first tree database 202 of local terminal C 104, and so on may be updated in real time in the same form. In addition, the file b uploaded to the server storage 102 may be downloaded to each of the local storage 302 of local terminal B 104, the local storage 302 of local terminal C 104, and so on. Through the above-described operations, the server storage 102 and each local terminal 104 may complete the synchronization process.

According to exemplary embodiments, the synchronization process is performed in each of the local terminals 104, rather than in the server, so that concentration of load to the server can be reduced and the load due to the synchronization can be distributed.

In addition, according to an exemplary embodiment, the latest metadata of the file in the local storage 302 and the latest metadata of the file in the server storage 102 are managed in the first tree database 202, which is a virtual database in the local terminal 104, and each of the local terminals 104 is allowed to upload or download the changed file on the basis of the metadata in the first tree database 202 so that a conflict that may occur due to multiple users simultaneously changing files can be minimized. In particular, according to one exemplary embodiment, paths for uploading/downloading the changed file and updating metadata of the changed file are separate from each other and the update of metadata that does not take a long time is quickly performed so that attribute information, such as a name, version, and the like of the changed file, can be always up-to-date, thereby minimizing an error in the synchronization process.

Figure 9:
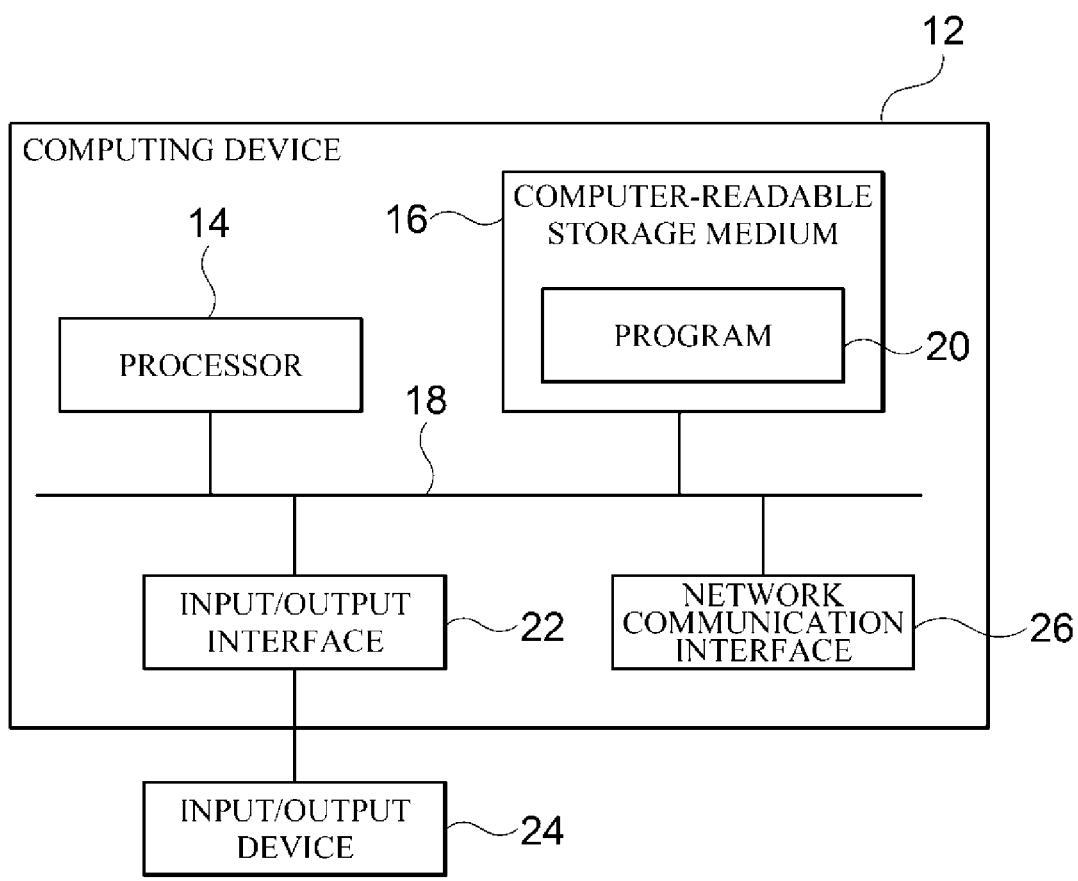
FIG. 9 is a block diagram for describing an example of a computing environment 10 including a computing device suitable to be used in exemplary embodiments.

FIG. 9 is a block diagram for describing an example of a computing environment 10 including a computing device suitable to be used in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device may be one or more components included in the synchronization system 100 or the local terminal 104.

The computing device 12 may include at least one processor 14, a computer-readable storage medium 16, and a communication bus 18. The processor 14 may cause the computing device 12 to operate according to the aforementioned exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device to perform operations according to the illustrative embodiment.

The computer-readable storage medium 16 is configured to store computer executable commands and program codes, program data and/or information in other suitable forms. The programs stored in the computer-readable storage medium 16 may include a set of commands executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the exemplary embodiments, the synchronization process is performed in each of the local terminals, rather than in the server, so that concentration of load to the server can be reduced and the load due to the synchronization can be distributed.

In addition, according to the exemplary embodiment, the latest metadata of the file in the local storage and the latest metadata of the file in the server storage are managed in the first tree database, which is a virtual database in the local terminal, and each of the local terminals is allowed to upload or download the changed file on the basis of the metadata in the first tree database so that a conflict that may occur due to multiple users simultaneously changing files can be minimized. In particular, according to one exemplary embodiment, paths for uploading/downloading the changed file and updating metadata of the changed file are separate from each other and the update of metadata that does not take a long time is quickly performed so that attribute information, such as a name, version, and the like of the changed file, can be always up-to-date, thereby minimizing an error in the synchronization process.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A local terminal having a local storage and performing file synchronization between a server storage and the local storage, the local terminal comprising:

at least one processor executing one or more programs stored in non-volatile computer-readable storage medium;

a first tree database executed by the processor to which latest metadata of a file in the local storage and latest metadata of a file in the server storage are updated in real time;

a first calculator executed by the processor configured to compare the metadata of the file in the local storage with metadata stored in the first tree database;

a first synchronizer executed by the processor comprising a first executor configured to, when from a comparison result of the first calculator it is determined that the file in the local storage has been changed, update the metadata of the file in the local storage in real time to the first tree database and an uploader configured to upload the changed file in the local storage to the server storage;

a detector executed by the processor configured to monitor the file in the server storage and, when the file in the server storage is changed, update metadata of the changed file in the server storage to a second tree database in the local terminal;

a second calculator executed by the processor configured to compare the metadata stored in the first tree database with metadata stored in the second tree database; and a second synchronizer executed by the processor comprising a second executor configured to, when from a comparison result of the second calculator it is determined that metadata newly updated to the second tree database is newer than the metadata stored in the first tree database, update the metadata newly updated to the second tree database in real time to the first tree database and a downloader configured to download the changed file in the server storage to the local storage.

2. The local terminal of claim 1, wherein the first executor updates the metadata of the changed file in the local storage in real time to the first tree database within a first period of time and the uploader uploads the changed file in the local storage to the server storage for a second period of time that is longer than the first period of time.

3. The local terminal of claim 1, wherein the second executor updates the metadata newly updated to the second tree database in real time to the first tree database within a third period of time and the downloader downloads the changed file in the server storage to the local storage for a fourth period of time that is longer than the third period of time.

4. The local terminal of claim 1, wherein the metadata update and file upload process in the first synchronizer is performed independently of the metadata update and file download process in the second synchronizer.

5. The local terminal of claim 1, wherein when the file in the local storage or the file in the server storage is changed a plurality of times, metadata of the changed files are updated in real time to the first tree database and then the changed files are uploaded to the server storage or downloaded to the local storage.

6. The local terminal of claim 1, wherein when it is determined that the metadata newly updated to the second tree database is newer than the metadata stored in the first tree database, it indicates that metadata of a file changed in a local storage in a different terminal is newly updated to the second tree database as the file changed in the local storage in the different local terminal is uploaded to the server storage.

7. The local terminal of claim 1, wherein when the comparison result of the first calculator indicates that the metadata of the file in the local storage matches the metadata stored in the first tree database and the comparison result of the second calculator indicates that the metadata stored in the second tree database matches the metadata stored in the first tree database, the file synchronization between the server storage and the local storage is completed.

8. The local terminal of claim 1, wherein the at least one processor includes a hardware processor.

9. The local terminal of claim 1, wherein the local terminal is selected from the group consisting of a desktop computer, a notebook computer, and a portable device.

10. A synchronization system comprising:
at least one processor executing one or more programs stored in non-volatile computer-readable storage medium;
a plurality of local terminals which each have a local storage and perform file synchronization between a set server storage and the local storage,
wherein each of the plurality of local terminals includes:
a first tree database executed by the processor to which latest metadata of a file in the local storage and latest metadata of a file in the server storage are updated in real time;
a first calculator executed by the processor configured to compare the metadata of the file in the local storage with metadata stored in the first tree database;
a first synchronizer executed by the processor comprising a first executor configured to, when from a comparison result of the first calculator it is determined that the file in the local storage has been changed, update the metadata of the file in the local storage in real time to the first tree database and an uploader configured to upload the changed file in the local storage to the server storage;
a detector executed by the processor configured to monitor the file in the server storage and, when the file in the server storage is changed, update metadata of the changed file in the server storage to a second tree database in the local terminal;
a second calculator executed by the processor configured to compare the metadata stored in the first tree database with metadata stored in the second tree database; and
a second synchronizer executed by the processor comprising a second executor configured to, when from a comparison result of the second calculator it is determined that metadata newly updated to the second tree database is newer than the metadata stored in the first tree database, update the metadata newly updated to the second tree database in real time to the first tree database and a downloader configured to download the changed file in the server storage to the local storage, and
the first tree database of each of the plurality of local terminals is updated in real time in the same form as each other.

11. The synchronization system of claim 10, wherein the at least one processor includes a hardware processor.

12. The synchronization system of claim 10, wherein the plurality of local terminals includes at least one of a desktop computer, a laptop computer, and a portable device.

* * * * *